United States Patent [19]

Randall et al.

[11] Patent Number: 5,589,833
[45] Date of Patent: Dec. 31, 1996

[54] RADAR ACQUISITION SYSTEM

[75] Inventors: Mitchell A. Randall, Longmont; Eric Loew, Boulder, both of Colo.

[73] Assignee: University Corporation for Atmospheric Research, Boulder, Colo.

[21] Appl. No.: 426,030

[22] Filed: Apr. 21, 1995

[51] Int. Cl.$^6$ .................................................. G01S 13/95
[52] U.S. Cl. ........................................... 342/195; 342/26
[58] Field of Search ................................... 342/194, 195, 342/196, 26, 59

[56] References Cited

U.S. PATENT DOCUMENTS

| | | | |
|---|---|---|---|
| 5,410,314 | 4/1995 | Frush et al. | 342/26 |
| 5,471,211 | 11/1995 | Randall et al. | 342/26 |

*Primary Examiner*—Daniel T. Pihulic
*Attorney, Agent, or Firm*—Duft, Graziano & Forest, P.C.

[57] ABSTRACT

The personal computer based integrated radar acquisition (PIRAQ) system integrates a programmable timing generator, a digital Intermediate Frequency (IF) processor, and a digital signal processor on a standardized personal computer "add-on" electronic circuit module that accepts standard IF input and produces standard radar display outputs. The digital intermediate frequency processor includes an IF pre-processor, a programmable digital matched filter, and a wide dynamic range digital baseband converter. Implementing the PIRAQ system in digital components on a single electronic circuit module for use in a personal computer provides and efficient, low-cost, portable, and programmable high-performance radar acquisition system hardware base from which radar signals can be digitally processed.

22 Claims, 7 Drawing Sheets

RADAR ACQUISITION SYSTEM

FIELD OF THE INVENTION

This invention relates to radar acquisition systems, and in particular, to an integrated radar acquisition system implemented on a single electronic circuit module for use in a personal computer.

PROBLEM

Present radar acquisition systems are comprised of a plurality of components distributed among a plurality of independent devices most of which are rack mounted electronic devices and circuit modules. In present radar acquisition systems the plurality of distributed components include: a radar receiver, analog to digital signal converters, timing generators, output display and recording processors, display modules, and analog Intermediate Frequency (IF) processor complex that includes an oscillator, an analog baseband downconverter, and dual channel filters.

While the present distributed component radar acquisition systems are functional, they lack portability, reliability, sometimes high quality output, and many times there are incompatibilities from one radar implementation to the next. The lack of portability is due to the multiple components distributed among the plurality of independent rack mounted electronic devices and circuit modules that comprise the radar acquisition system. The lack of reliability is due to the multiple hardware failure points present in a distributed system because each component relies on its own system support including, but not limited to, power supplies, memories, multiple wire/coaxial cable connections, communication protocol and interfaces, and cooling systems. The lack of high quality output often results from a corrupted data stream due to noise and/or other interference introduced into the data stream by the wire and/or coaxial cables interconnecting the primarily analog radar acquisition system components. Incompatibility across different radar installations is due to the customization required for each radar acquisition system from one radar installation to the next, even if similar radar acquisition system components are being used in each installation.

Although each of the acquisition system components discussed above are not individually complex or individually responsible for all the above-stated problems, a fully functioning radar acquisition system comprising a plurality of independent distributed components results in a complex network of wires and equipment in nonstandard configurations that are difficult to maintain. Therefore, maintainability for a radar acquisition system is also a problem because it is uncommon for any one radar installation to have a technician available who understands every radar acquisition system component in a given radar installation and the component connectivity and/or interaction with neighboring components should the need arise to repair, replace, or reconfigure the radar acquisition system or any component therein. The longstanding need for a simpler, inexpensive, and more reliable high-performance digital radar acquisition system has heretofore not been met.

SOLUTION

The above described problems are solved and a technical advance achieved in the field by the radar acquisition system of the present invention. The radar acquisition system of the present invention includes: an antenna for receiving radio waves, an analog radio wave conversion receiver, and a single electronic circuit module that accepts standard Intermediate Frequency (IF) radar input and produces standard radar display output. In addition, the system includes a personal computer, or any other electronic system, that works synergistically with the electronic circuit module and supports user customized application processes with processing facilities, memory, and display and data recording facilities. Any other electronic system used with the electronic circuit module would have a processor, a memory, and typically a display, where the electronic system is capable of communicating with and/or hosting the electronic circuit module. By integrating the primary radar acquisition and signal processing functions of the multiple distributed components previously mentioned onto a single electronic circuit module having a standard personal computer "add-on" module format, an efficient programmable desktop radar acquisition system is available by way of a standard personal computer host system.

Primary components integrated onto the electronic circuit module of the Personal Computer Integrated Radar Acquisition (PIRAQ) system include, but are not limited to, digital components such as a programmable timing generator, a digital IF processor, and a digital signal processor. The digital IF processor further includes a IF pre-processor, a programmable digital matched filter, and a wide dynamic range digital baseband downconverter to eliminate low frequency interference, DC drift, and phase amplitude mismatches.

Key to providing higher quality output over existing radar acquisition systems is that the PIRAQ system digitally processes the incoming IF radar signals before noise and/or other interference becomes an inseparable part of the signal. Integrating the PIRAQ system components onto an electronic circuit module format standard among personal computer "add-on" boards provides a portable, reliable, low-cost, high-resolution, high-performance system in a standardized easily maintained format. In addition, integrating the PIRAQ system components as digital components on a single electronic circuit module, facilitates high-speed signal transmission over short signal paths thereby eliminating the "antenna" characteristic of external wires and/or cables that produces signal interference. Further, the PIRAQ system's programmability and display outputs provide the wide ranging compatibility that is desirable in order to use the PIRAQ system in a wide range of diverse radar installations.

Finally, the PIRAQ system is highly reliable because all but the radar antenna and receiver is embodied on a single electronic circuit board that relies on standardized and readily available personal computer host system hardware. The result is a radar acquisition system providing greater radar deployment flexibility, output quality, and ease of use over presently available systems without the need for assembling multiple diverse hardware components or facing extensive experimentation to construct a radar acquisition system.

DETAILED DESCRIPTION

Figure 1:
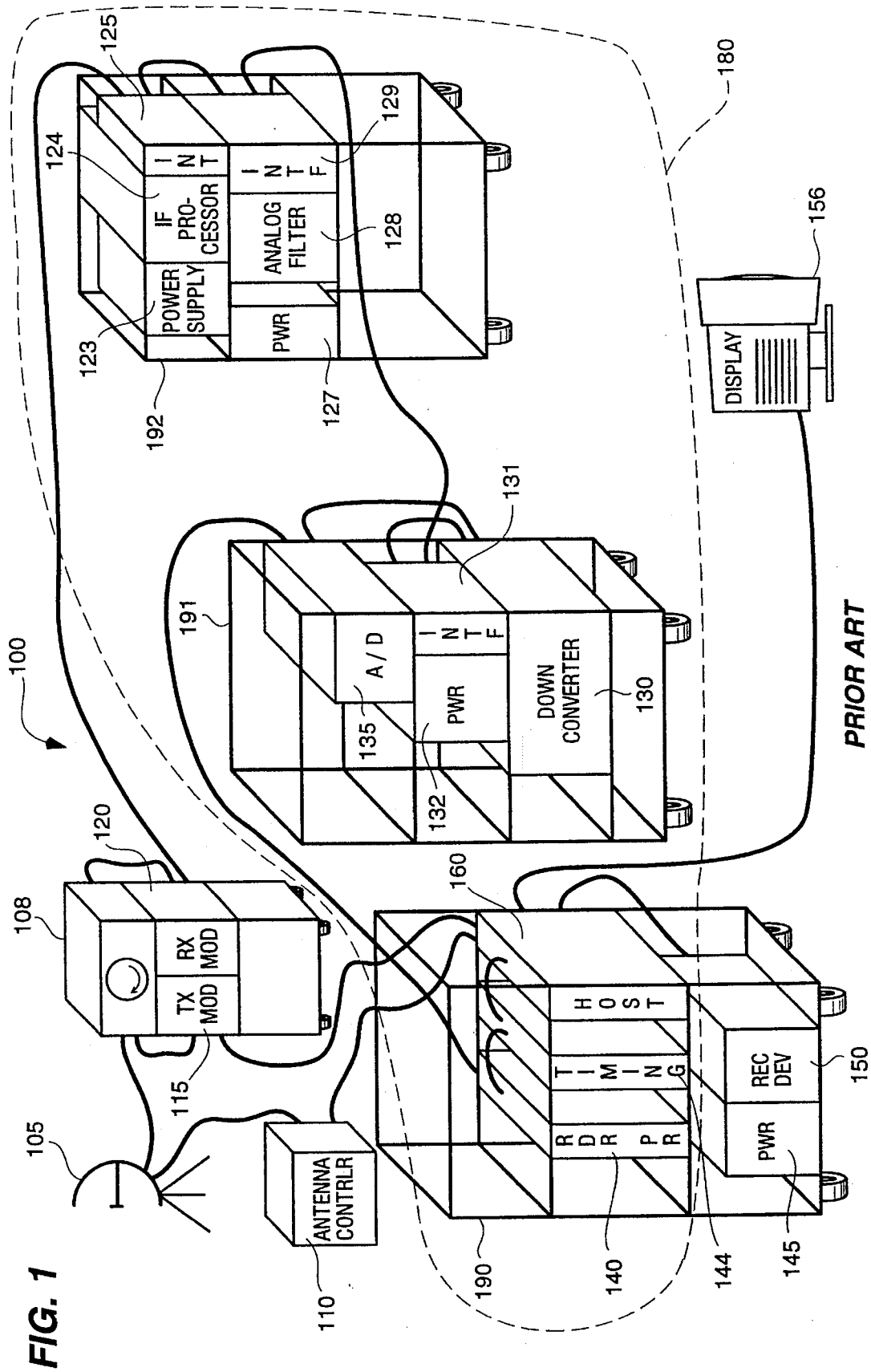
FIG. 1 illustrates an existing radar acquisition system configuration.

Existing Radar Acquisition System—FIG. 1

FIG. 1 illustrates a typical prior art meteorological radar system 100 in block diagram form. Radar system 100 may be a Doppler radar or Bistatic radar for example, or any other type radar installation. Radar system 100 includes: a radar antenna 105 driven by an antenna controller 110, in addition to a transmitter 115 and receiver 120 operatively connected to radar antenna 105 by way of a transmit/receive switch 108. Other major system components include a radar data acquisition and processing system 180, display and data recording devices 156 and 150 respectively, and a host processor 160 coordinating the above identified components and their processes.

One problem with the typical radar configuration 100 is that the radar acquisition system 180 and its individual components are distributed among multiple rack chassis 190–192 that each contain either rack mountable components or individual circuit boards mounted in card cages in a manner well known in the art. Not only do rack chassis 190–192 create a non-portable radar acquisition system 180, the multiple distributed, and primarily analog components create a reliability and maintainability problem, and wire and/or coaxial cable connectivity between components in the system are a source of noise and other interference which corrupts the radar signal being processed. Specifically, external cables and connectors act as antennas that attract spurious noise that corrupts the signal.

Present implementations of radar acquisition system 180 are typically unique to the radar installation because the distributed system components therein may be configured in any number of configurations and are individually tunable in order to accommodate specific implementation requirements. In the present FIG. 1 illustration, the radar acquisition system 180 is comprised of numerous components, including an analog IF processor 124 which receives analog IF input from radar receiver 120 by way of an interface card 125. The IF processor 124 and interface card 125 are rack mounted components powered by power supply 123. One problem with the typical analog IF processor 124 is that it amplifies the incoming radar IF signal without first filtering out signal noise thereby making the useful signal inseparable from the noise. This results in a poor quality and inaccurate signal for further processing or display. In addition, none of the filters in the IF processor 124 are programmable so that a manually operated select switch is required to make multiple preset non-programmable filters available each with a different filter option selection.

Analog IF processor 124 passes the radar signal through interface card 125 to an analog filter 128 by way of interface card 129. The analog filter 128 and interface card 129 are rack mounted components within rack chassis 192 powered by power supply 127. Analog filter 128 passes the radar signal from interface card 129 to an analog baseband downconverter 130 by way of yet another interface card 131. The analog baseband downconverter 130, its interface card 131, and the analog to digital signal converter 135, are rack mounted components within rack chassis 191 powered collectively, or individually as a matter of component requirements, by power supply 132.

One problem with existing analog baseband downconverters is the limited dynamic range due to DC drift and susceptibility to low frequency interference affecting signal frequencies. Other problems include non-linearity, poor phase lock and amplitude matching of the in-phase and quadrature (I and Q) data output to the 12 bit level desired by users. Still other problems result from separate analog to digital converters being required for the I and Q data individually so that each output must be amplitude matched and DC offset to account for DC drift. In addition, any noise introduced by the analog to digital converter 135 is carried directly into the radar processor 140 along with the data.

Analog to digital converter 135 passes the digitized radar signal to radar processor 140 for data processing including, but not limited to, clutter filtering and spectral moment calculations. Radar processor 140, system timing generator 144, and host processor 160 are independent circuit board components mounted in a card cage within equipment rack chassis 190. Host processor 160 controls the radar acquisition system 180 generally, in addition to specifically controlling the antenna controller 110, radar transmitter 115, display screen 156, and recording device 150. The recording device 150 can be a standard rack mounted disk or tape system as a matter of design choice. Timing generator 144 provides reference signals as needed throughout the system.

While the traditional prior art radar acquisition system 180 serves its basic purpose once implemented, it is susceptible to limited performance due to its analog signal processing components and failure prone support components that include, but are not limited to: the distributed and duplicative power supplies 123, 127, 132, and 145, interface cards 125, 129, and 131, and cooling systems (not shown). Further, radar acquisition system 180 is non-compact due to the multiple distributed components scattered among rack chassis 190–192. Poor quality output often results from signal corrupting noise on the multiple cables between components and direct current drift problems in both amplifiers and/or down converters 130, and the I and Q analog to digital converter 135.

Figure 2:
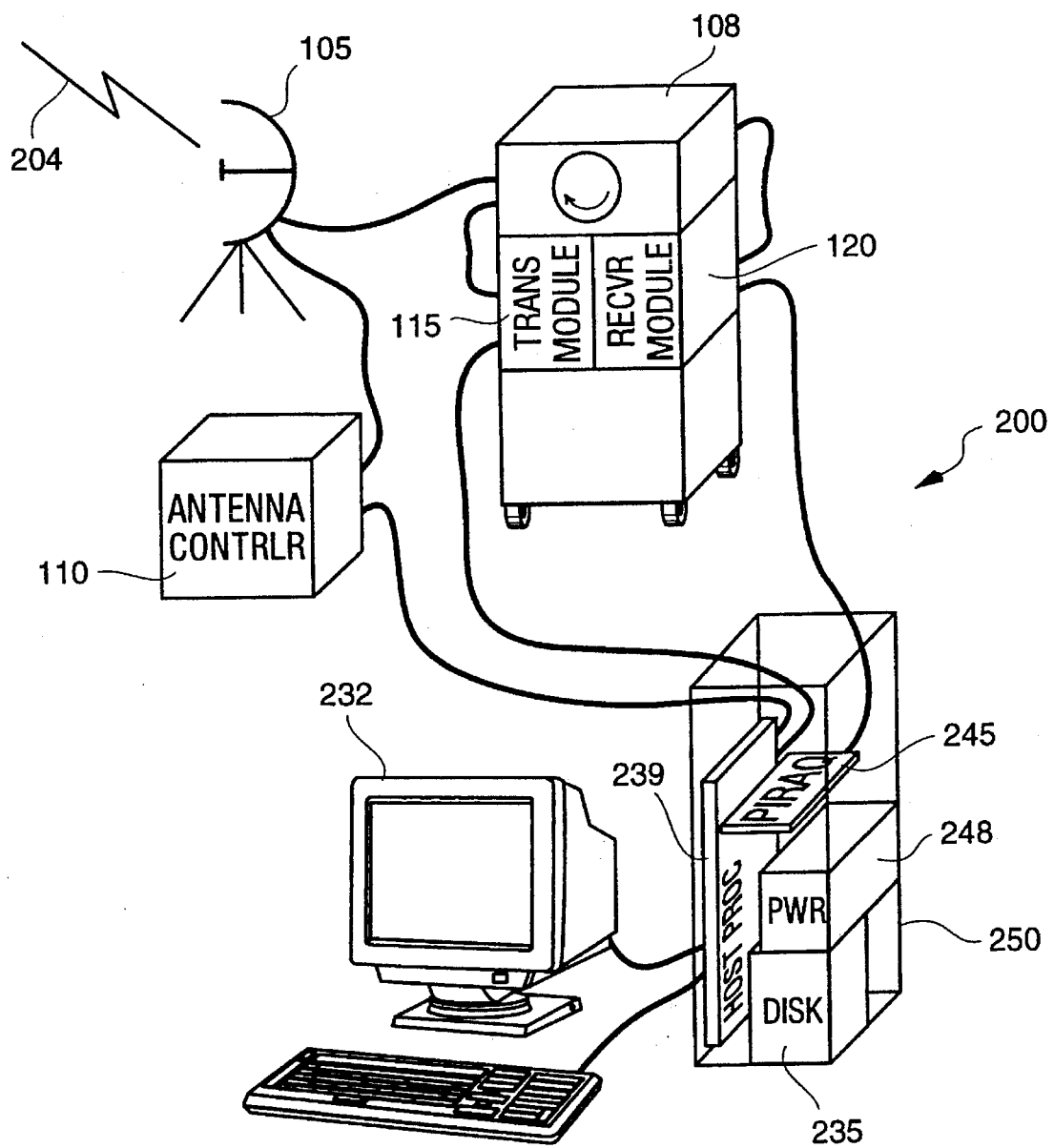
FIG. 2 illustrates the PIRAQ system configuration.

Personal Computer Integrated Radar Acquisition (PIRAQ) System—FIG. 2

FIG. 2 illustrates a preferred embodiment of the PIRAQ system 200 of the present invention that is similar in overall function to radar system 100 yet vastly different in implementation and performance. PIRAQ system 200 may be used with a Doppler radar or Bistatic radar for example, although, no limitation as to radar type or class is intended and variations existing among any such radar type or class are transparent to the present invention and within the scope of use of the present invention.

PIRAQ system 200 includes an antenna 105 that is a means for receiving a radio wave, and is directionally driven by an antenna controller 110. Transmitter 115 produces the radio wave that antenna 105 receives after the radio wave is reflected off a target and travels back to antenna 105. Receiver 120 amplifies the radio wave received by antenna 105 and converts the radio wave into an analog signal in IF form. Transmitter 115 and receiver 120 are operatively connected to antenna 105 by way of transmit/receive switch 108 that switches back and fourth between transmitter 115 and receiver 120 in order to share antenna 105.

The IF output from receiver 120 is connected directly to electronic circuit module 245 embodying the PIRAQ system 200 components. Electronic circuit module 245 is a standard "add-on" format electronic circuit module for use in a standard personal computer cabinet 250. The standard personal computer cabinet 250 includes a standard personal computer (PC) host processor 239, power supply 248, and disk 235 or other storage system and/or media type as a matter of design choice. The PC host processor 239 operates synergistically with the PIRAQ system 200 to process radar data, in addition to controlling the transmitter 115, antenna controller 110, and display screen 232 facilities.

Key to PIRAQ system 200 is the radar acquisition system on electronic circuit module 245 and its compatibility with a wide variety of radar installations based on the PIRAQ programmability, portability, and the ability to accept standard IF input and produce high-quality standard radar display output. PIRAQ system 200 integrates fundamental component features of the radar acquisition system 180 of FIG. 1 in a primarily digital form on electronic circuit module 245 thereby achieving portability, compatibility, and reliability. Enhanced performance is also achieved by using digital integrated circuit components. In addition, by processing the 60 MHz IF data in 16 MHz samples as is the case in the preferred embodiment, PIRAQ system 200 provides over-sampling capability and makes available additional bandwidth that is useful for subsequent signal filtering in a manner not easily accomplished in prior art analog non-integrated and/or distributed systems. It is difficult to transmit analog signals at high speed between analog acquisition components without sacrificing signal quality due to interference and noise attracted by the antenna effect commonly encountered with external cables and connectors.

Other key feature of PIRAQ system 200 include, but are not limited to, performing an analog to digital conversion on the radar signal at the IF input stage rather than at the I and Q output stage. Also, performing a baseband conversion on the IF input within the digital IF processor in a digital fashion, avoids signal interference and phase and amplitude imbalance problems that plague prior art analog style signal processors. The digital IF processor 304 contains digital quadrature downconverters 422–423 and 426–427, and programmable digital matched filters 424 and 428 for the individual I and Q signal components. Specifically, the digital matched filters 424 and 428 are programmable to optimally match available radar pulse widths transmitted by transmitter 115 by way of antenna 105. Because the analog to digital IF signal conversion occurs before the filtering by matched filters 424 and 428 within digital IF processor 304, noise produced by analog to digital converter 425 is also reduced. Filtering the signal prior to processing the signal separates noise from the useful signal before the two are inseparable due to processing, thereby significantly improving the quality of the signal that subsequently processed or displayed. For example, for a 1 μs pulse width, filtering the signal with matched filters 424 and 428 can reduce analog to digital conversion noise by about 10 dB.

Figure 3:
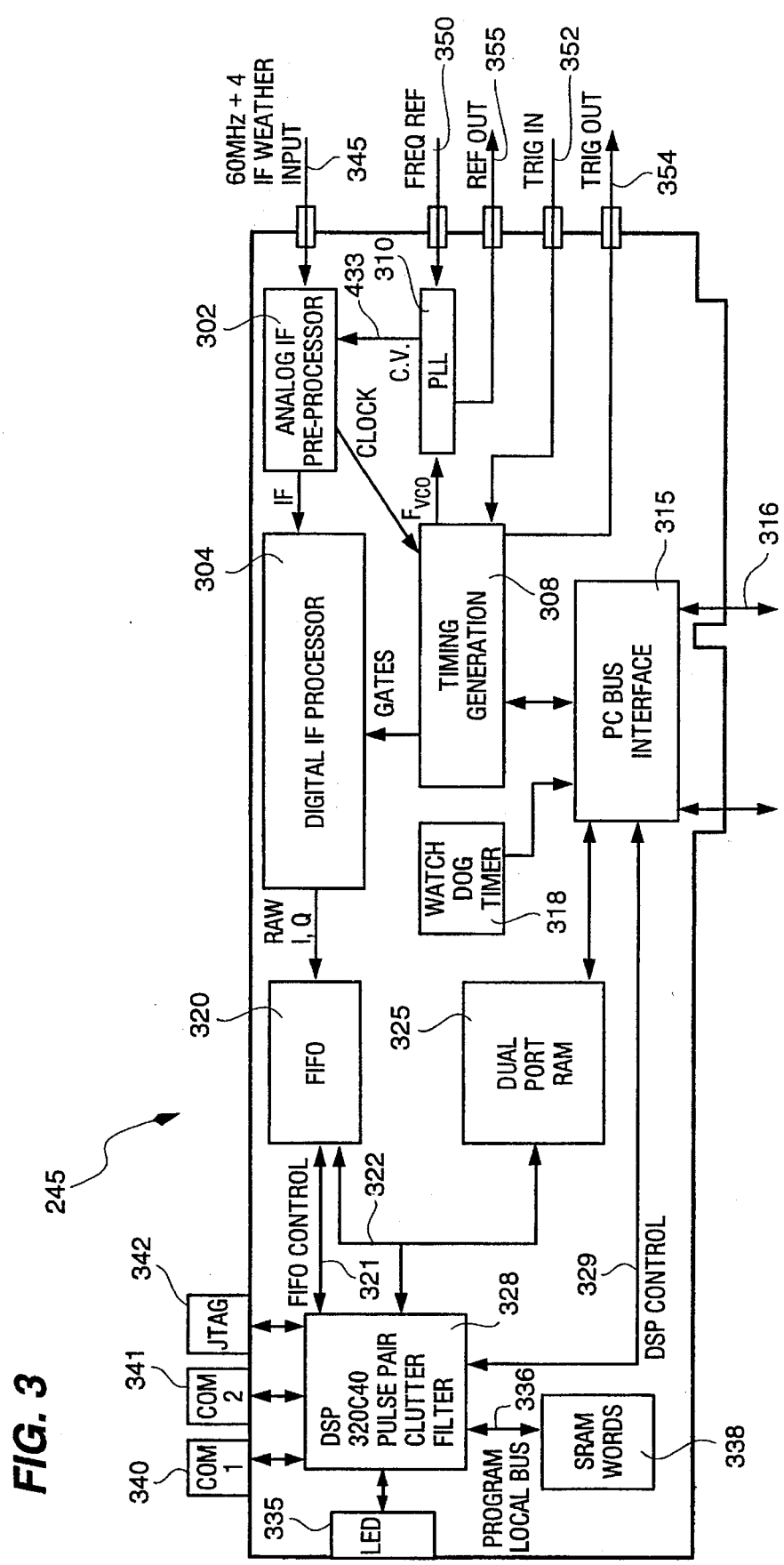
FIG. 3 illustrates the PIRAQ system electronic circuit module layout in block diagram form.

Electronic Circuit Module Embodiment—FIG. 3

FIG. 3 illustrates PIRAQ system 200 components, in addition to the inputs accepted by, and output produced by, electronic circuit module 245. Digital Signal Processor (DSP) 328 is the main processor on the electronic circuit module 245 that serves two main purposes. The two main purposes include, but are not limited to, controlling and/or coordinating general board level functions and interaction with PC host processor 239, and processing analog IF input at high speed to produce raw I and Q radar data output. The raw I and Q data is passed to the PC host processor 239 by way of the PC Bus interface 315 output 316, where the PC host processor 239 can perform subsequent formatting, display, and/or recording of processed data in a manner subject to user customization. High-speed signal processing by DSP 328 is programmable for user customization as a matter of design choice. Typical DSP 328 high-speed signal processing tasks are floating point intensive calculations that include, but are not limited to, spectral moment calculations such as velocity, reflectivity, velocity spectrum width, averages, and other data reduction computations.

DSP 328 also supports three external communication ports COM1 340, COM2 341, and Joint Test Action Group (JTAG) 342. Additional external ports can be supported as a matter of design choice. The communication ports COM1 340 and COM2 341 are used to daisy-chain multiple electronic circuit modules 245 together within the same PC 250, or between two or more independent computers similar in function to PC 250 as a matter of design choice and radar installation requirements. The JTAG 342 external diagnostic port is an industry standard debugging interface to DSP 328.

Light Emitting Diode (LED) bank 335 supports six addressable user definable LED's and four predefined system LED's, each controlled by DSP 328. Additional LED's can be supported as a matter of design choice. Addressable user definable LEDs in LED bank 335 can be used for error reporting, such as to report a missing end of frame indication when DSP 328 is reading raw I and Q radar data from First In First Out (FIFO) memory 320 for example. Other error indication purpose may be implemented by the user as a matter of design choice. Predefined LED's include partial full and full threshold indicators for FIFO 320. A third predefined LED is the watchdog control signal for the watchdog timer circuit 318, that indicates whether or not the watchdog timer circuit 318 is enabled or not. Whether the watchdog timer circuit 318 is enabled or not is a way to tell if the electronic circuit module 245 is properly operating. Without watchdog circuit 318 continuously toggling, watchdog circuit 318 can reset the PC host processor 239 if desired and so connected as a matter of design choice. A fourth predefined LED is a phase lock indicator indicating that the IF pre-processor 302 is phase locked with the reference radar input 345.

Static RAM (SRAM) memory 338 services DSP 328 over a local DSP bus 336 as a zero wait state work area. The SRAM 338 is available as needed as a matter of user design choice. FIFO 320 queues raw I and Q radar data output by digital IF processor 304. DSP 328 reads the raw I and Q data from FIFO 320 as FIFO 320 communicates to DSP 328 that the data is available by way of FIFO control channel 321. Among the operations DSP 328 performs with respect to FIFO 320, are read data and clear data operations. FIFO 320 also uses FIFO control channel 321 to communicate quarter full, half full, and three quarter full interrupts to DSP 328 in order to notify DSP 328 of the capacity threshold levels reached by FIFO 320 as FIFO 320 accepts raw I and Q output from digital IF processor 304. DSP 328 can poll FIFO control channel 321 inputs to determine FIFO 320 threshold capacity indicators, or respond to FIFO 320 interrupts, as a matter of design choice.

Global bus 322 connects FIFO 320 and Dual Port Random Access Memory (DPRAM) 325, with DSP 328. Global bus 322 is set up in a zero wait state configuration to facilitate fast transfer between either the FIFO memory 320 and DPRAM 325, or between either of the memory devices and the DSP 328.

Watchdog timer 318 controls an interface to the Personal Computer Bus interface (PC Bus) 315 and remains disabled while electronic circuit module 245 is functioning properly. If watchdog 318 is not addressed for a specified period, electronic circuit module 245 will reset the PC host processor 239. Six I/O addressable words are used to control the electronic circuit module 245. The words include four bytes used by the timing generator 308, a one byte control word to control general purpose PIRAQ parameters such as DSP reset, timer generator reset, timer generator mode, watchdog enable, PC interrupt enable, and PC interrupt status. One final byte is used to set the DPRAM 325 base address.

DSP control 329 connects PC Bus 315 and DSP 328. One lead of DSP control 329 is a PC interrupt for communication between the circuit module 245 and the status word for the PC host processor 239. A second DSP control 329 lead is a DSPREADY indicator that is held low when DSP 328 is in reset, and enabled when DSP 328 is released from reset. A third lead of DSP control 329 is used to communicate a DSPRESET to place DSP 328 in reset.

The control word in PC Bus interface 315 controls the timing generator 308 by multiple mode settings that are available as a matter of design choice. For example, a timer reset lead can reset the timing generator 308 to a known state. Additionally, trigger modes allow timing generator 208 to respond to external trigger input 352 in order to execute a predetermined range gate count and/or delay program, respond to external trigger input 352 in a predetermined count only mode, or respond to external trigger input 352 in a Global Positioning System (GPS) synchronous mode.

Figure 7:
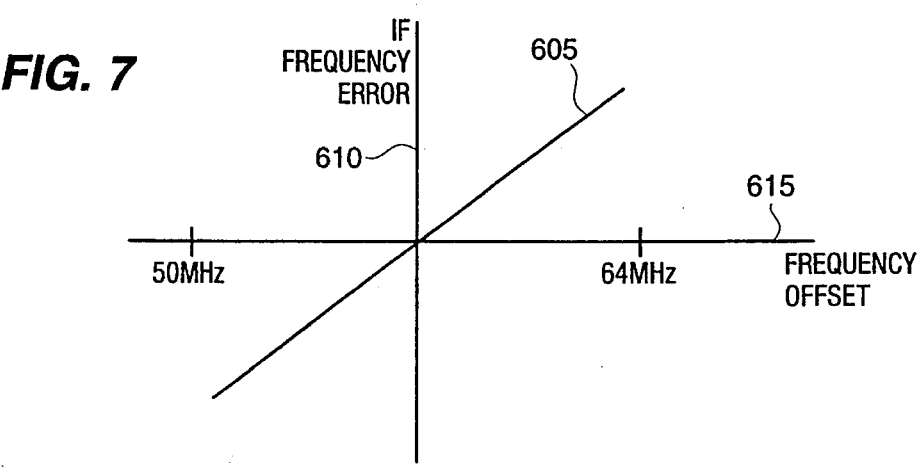
FIGS. 7–9 illustrate the IF frequency error to frequency offset ratios in graphic form.
Figure 8:
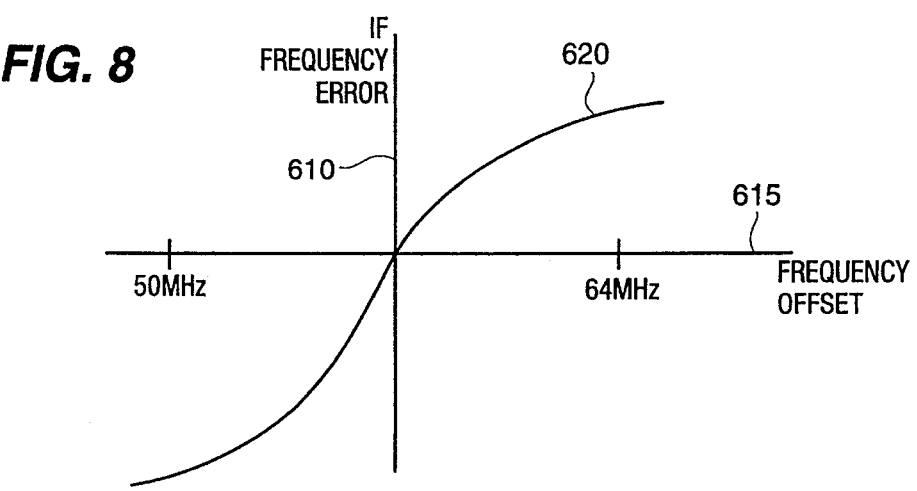
Figure 9:
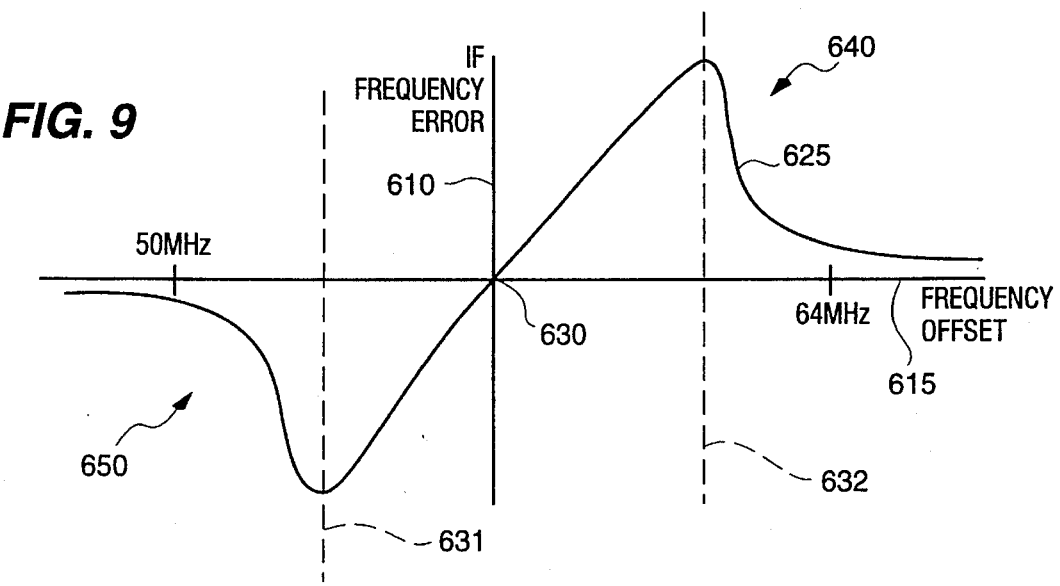

Digital Frequency Discrimination—FIGS. 7–9

DSP 328 can also be used to perform a digital frequency discrimination for the purpose of analog frequency calibration adjustments. The adjustments are necessary if the radar implementation uses a magentron or other incoherent radar transmitter. Using very little additional DSP 328 processing power to digitally post-process the raw I and Q radar data from digital IF processor 304, DSP 328 provides an inexpensive and highly effective alternative to implementing a high-frequency pulsed Doppler radar having fully coherent transmission and reception, without any additional hardware such as an expensive klystron or TWT amplifier in the radar transmitter 115. Specifically, digitally processing the raw I and Q data already available to DSP 328, eliminates the need for additional frequency discrimination or calibration hardware typically required to make frequency calibration adjustments. Implementing the frequency discrimination solution digitally in the DSP 328, the accuracy, efficiency, and response to mismatches identified between incoherent radar transmission frequencies and ideal or desired frequencies, is improved on an order superior to previous analog or digital discrimination and/or calibration techniques.

Performing digital frequency discrimination by way of DSP 328 is accomplished by taking advantage of a special gate zero (GO) mode. The GO mode is where the first radar signal sample in a set of radar signal samples within a given radar pulse width is processed differently than subsequent radar signal samples within the same radar pulse width. In the GO mode, intermediate radar signal component values used by multiplier/accumulators 420 and 421 to calculate both I and Q for the first filtered radar signal sample are written to FIFO 320. One such intermediate signal component value exists for each signal sample taken by the analog to digital converter 425. The intermediate signal component values occur at a constant 16 MHz rate. By performing simple calculations on the intermediate signal component values already available to DSP 328, the original analog IF input data can be derived without affecting the raw I and Q data result for the first filtered radar signal sample.

The GO mode can be used for any purpose other than digital frequency discrimination as a matter of design choice. However, using the GO mode for digital frequency discrimination and compensation is easily arranged by coordinating the radar transmission trigger timing with the radar transmit pulse width such that they both occur coincident with the gate zero sampling. In addition, the radar receiver 120 can be designed such that during the radar transmit pulse, the IF amplitude will not saturate the IF input 345 to the electronic circuit module 245. Given this, an exact frequency error signal can be obtained for use in compensating for a frequency mismatch for each sample set available within consecutive pulse widths using formula (1) below:

$$ERR = A\text{SIN}\left[\frac{AD - BC}{B^2 - BD + C^2 - CA}\right] \quad (1)$$

where A, B, C, and D are four consecutive signal samples of the transmit pulse. FIG. 7 illustrates the linear relationship 605 between IF frequency error 610 and frequency offset 615 for transmission frequencies in the range of at or about 56 MHz to 64 MHz. Depending where an IF frequency error falls along the frequency offset 615 continuum from an ideal zero error frequency, transmission frequency compensation can adjust for the error.

A more computationally efficient approximation can be obtained using the same four consecutive signal samples using formula (2) below:

$$ERR = \frac{AD - BC}{B^2 - BD + C^2 - CA} \quad (2)$$

The formula (2) approximation is non-linear, however, it maintains monotonically increasing result as a function of frequency error. FIG. 8 illustrates the non-linear relationship 620 between IF frequency error 610 and frequency offset 615 for transmission frequencies in the range of at or about 56 MHz to 64 MHz. As with FIG. 7, depending where an IF frequency error falls along the frequency offset 615 continuum from an ideal zero error frequency, transmission frequency compensation can adjust for the error.

A still more computationally efficient approximation can be obtained using the same four consecutive signal samples using formula (3) below:

$$ERR = AD - BC \quad (3)$$

The formula (3) approximation also produces a non-linear relationship 625 between IF frequency error 610 and frequency offset 615 that does not strictly increase as a function of IF frequency error. However, the function is approximately linear near the zero error point 630 between frequency range 631 to 632 as illustrated in FIG. 9. Note that the relationship 625 is always positive 640 for positive IF frequency error, and negative 650 for negative IF frequency error, which is a minimum requirement for stability in a frequency compensation loop. As with FIGS. 7 and 8, depending where an IF frequency error falls along the frequency offset 615 continuum from an ideal zero error frequency, transmission frequency compensation can adjust for the error. Once the IF frequency error has been minimized with one of the above techniques, a Dopplerized signal can be retrieved by standard techniques using the measured phase of the transmit pulse obtained from gate zero.

Figure 4:
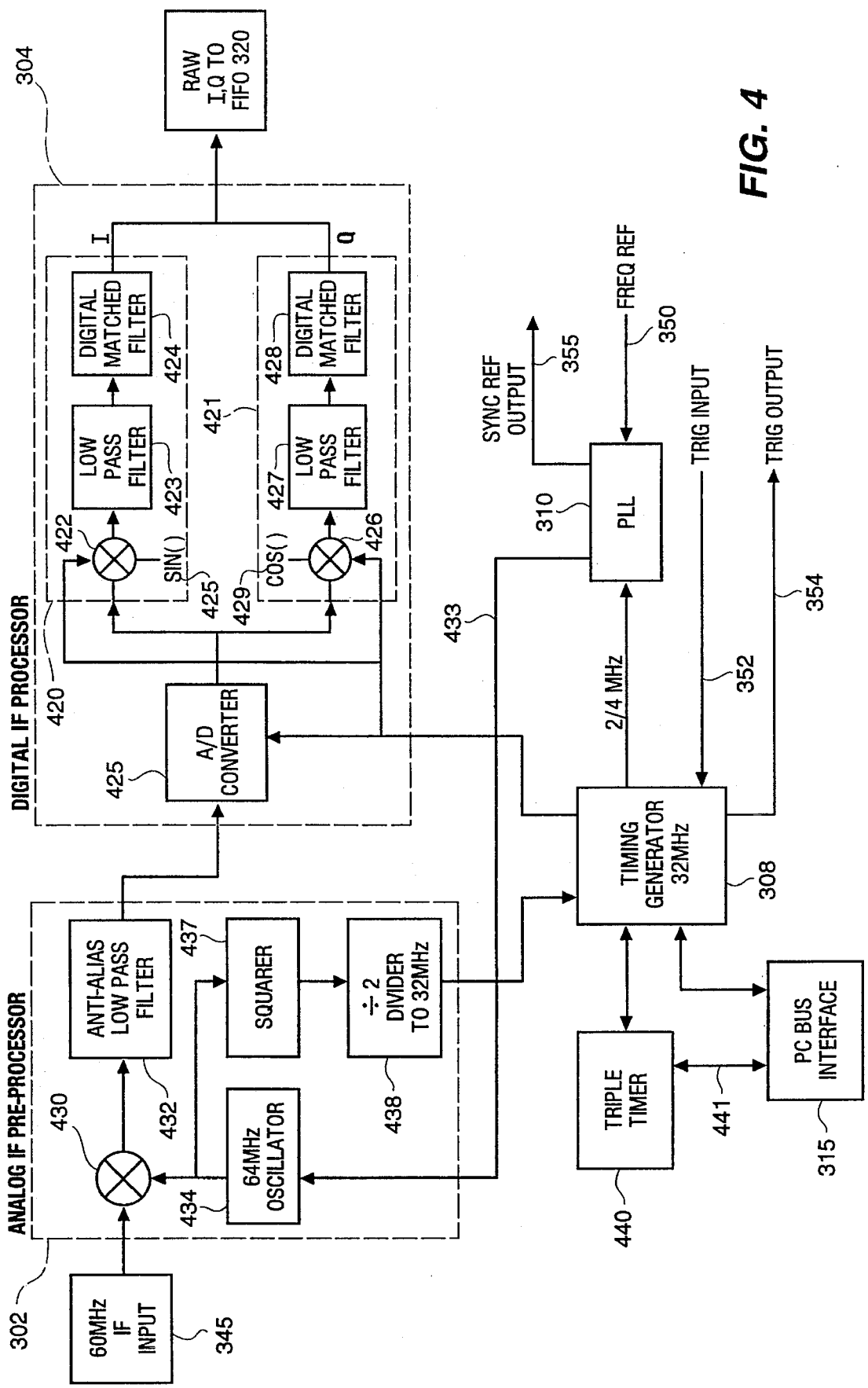
FIG. 4 illustrates PIRAQ system components in block diagram form.

Detailed PIRAQ Components—FIG. 4

FIG. 4 illustrates details of timing generator 308, IF processor 304, IF pre-processor 302 and phase lock loop (PLL) 310. IF pre-processor 302 accepts analog IF input 345 and functions to pre-condition and filter the raw IF input 345 to provide for more reliable and efficient digital processing not otherwise possible by attempting to digitize the full IF input bandwidth directly as a first processing step commonly performed in prior art acquisition systems. IF input 345, in the preferred embodiment, is a 64 MHz signal although any other known frequencies may be input as a matter of design choice, radar installation, or radar type requirements.

Frequency mixer 430 has two inputs and one output and functions to mix the IF input down to a center frequency for more reliable and efficient digital conversion. The preferred center frequency is at or about 4 MHz having a bandwidth of at or about 8 MHz. The first input to frequency mixer 430 is a known radio frequency input. In the present embodiment the known radio frequency input is provided by IF input 345. The second input to frequency mixer 430 is from local oscillator 434 operating off control voltage input 433 from PLL 310. The single output from frequency mixer 430 is an IF signal made up of a series of sums and differences of the IF input signal and local oscillator frequencies.

Input to anti-alias low pass filter 432 is the output from frequency mixer 430. The purpose of the anti-alias low pass filter 432 is to remove the sums of the previously mixed IF input and local oscillator frequencies, thereby ridding the signal of unwanted low frequency interference prior to digitizing the signal. Filtering by anti-alias low pass filter 432 maintains a high quality high frequency signal for subsequent digital processing.

Squarer 437 produces a square wave signal from the local oscillator 434 output frequency. The square wave signal is subsequently divided by frequency divider 438 to provide a 32 MHz timing signal reference for timing generator 308. While not all components require 32 MHz timing, the timing generator 308 provides timing signals in even divisions of 32 MHz as a matter of design, so that only one timing generator is needed to satisfy all timing requirements by components on electronic circuit module 245.

Digital IF processor 304 accepts an anti-alias analog IF signal as input from IF pre-processor 302. Output from digital IF processor 304 is raw I and Q radar data for queuing on FIFO queue 320 and subsequent high-speed processing by DSP 328. Analog to digital converter 425 digitizes the analog IF signal input from IF pre-processor 302, subject to a 16 MHz timing control signal from timing generator 308. The digitized output is applied to multiplier accumulators 420 and 421 respectively which are designed to digitally reduce the digitized IF signal to its I and Q signal components by way of digital quadrature down converter 422–423 and 426–427, and programmable digital matched filters 424 and 428.

Digital mixers 422 and 426 mix range gate dependent local oscillator frequency input from timing generator 308 with respective either sine (x) or cosine (x) input from the digitized IF input signal. Digital mixers 422 and 426 produce a sum and difference frequency output for the I or Q signal components respectively. Depending on the radar signal pulse widths and because the digital mixers 422 and 426 have a 90° phase difference due to the respective sine(x) and cosine(x) oscillator inputs, odd radar signal samples within the digitized IF signal are used to calculate in-phase signal components, and even radar signal samples within the digitized IF signal are used to calculate quadrature signal components.

The sampling frequency from timing generator 308 may vary depending on range gate widths. In addition, the timing generator 308 sets the initial summation to zero to indicate the beginning of every gate multiplication or accumulation sequence within multiplier accumulators 420 and 421 respectively. Low pass filters 423 and 427 remove the sum frequencies produced by digital mixers 422 and 426 respectively which produces only the desirable baseband signal from the in-phase and quadrature signal components.

Digital matched filters 424 and 428 optimize the signal to noise ratio within the I and Q signal components. The programmability of the digital matched filters 424 and 428 facilitates user customization based on numbers of gate ranges, pulse widths, and control frequencies.

Digital IF processor 304 provides significant advantages over prior art analog IF processors in that the digital IF processor 304 digitizes a preconditioned and pre-filtered IF signal thereby preventing noise and interference from becoming part of the signal itself. In addition, the digital IF processor 304 is immune to DC drift and has superior ability to reduce or eliminate analog to digital conversion noise, low frequency interference produced by frequency mixers, and any other non-linearity, by way of low pass filters 423 and 427 and digital matched filters 424 and 428.

Triple timer 440 is comprised of three timers. One timer generates a divide by "n" value used to determine range gate lengths. A second timer is a delay timer providing a pause where triple timer 940 is halted for a predetermined period. A third timer in triple timer 440 is a range gate counter to count the number of range gates having passed prior to delaying processing by the second timer discussed previously. Lead 441 from triple timer 440 to PC bus 315, is used to program triple timer 440 as desired as a matter of design choice and/or user customization. Trigger input 352 to timing generator 308 controls and/or selects the three timing modes of triple timer 440. Trigger output 354 from timing generator 308 is useful for analysis or debugging purposes, or to provide a timing signal from timing generator 308 to other PIRAQ systems if attached.

PLL 310 accepts a jumper programmable timing signal of 2 or 4 MHz from timing generator 308. More importantly, frequency reference input 350 is a user selectable frequency based on user pre-set dip switches as a matter of user installation requirements for a given radar installation. The input frequency reference 350 is instrumental in the control voltage signal 433 to local oscillator 434. Synchronous reference output 355 provides a reference signal for other PIRAQ systems where synchronous network connections are desirable among PIRAQ systems. The frequency of synchronous reference output 355 is jumper selectable and is subject to user customization desires.

Figure 5:
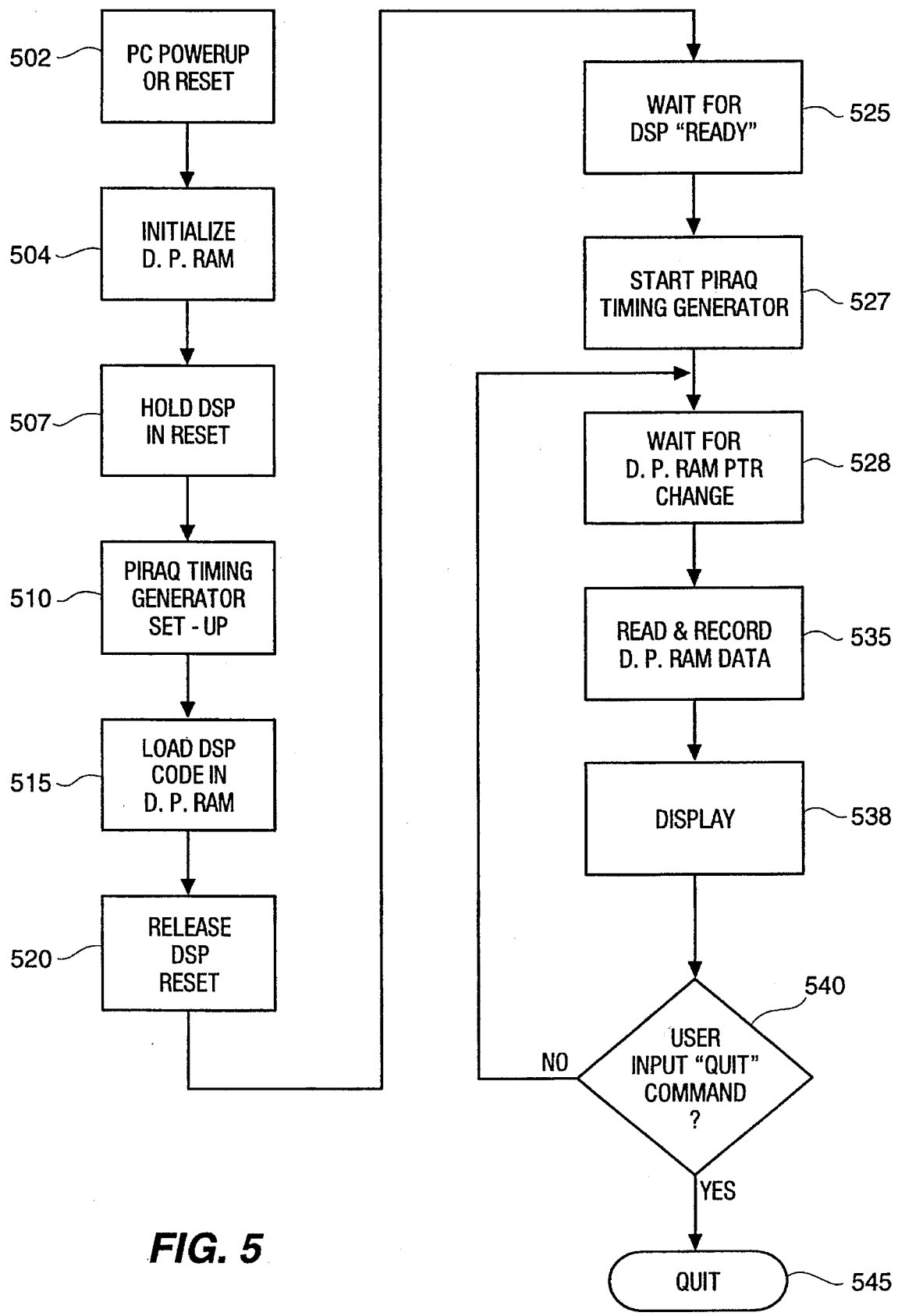
FIGS. 5 and 6 illustrate the operating steps of the PIRAQ system's personal computer host and electronic circuit module respectfully in flow diagram form.
Figure 6:
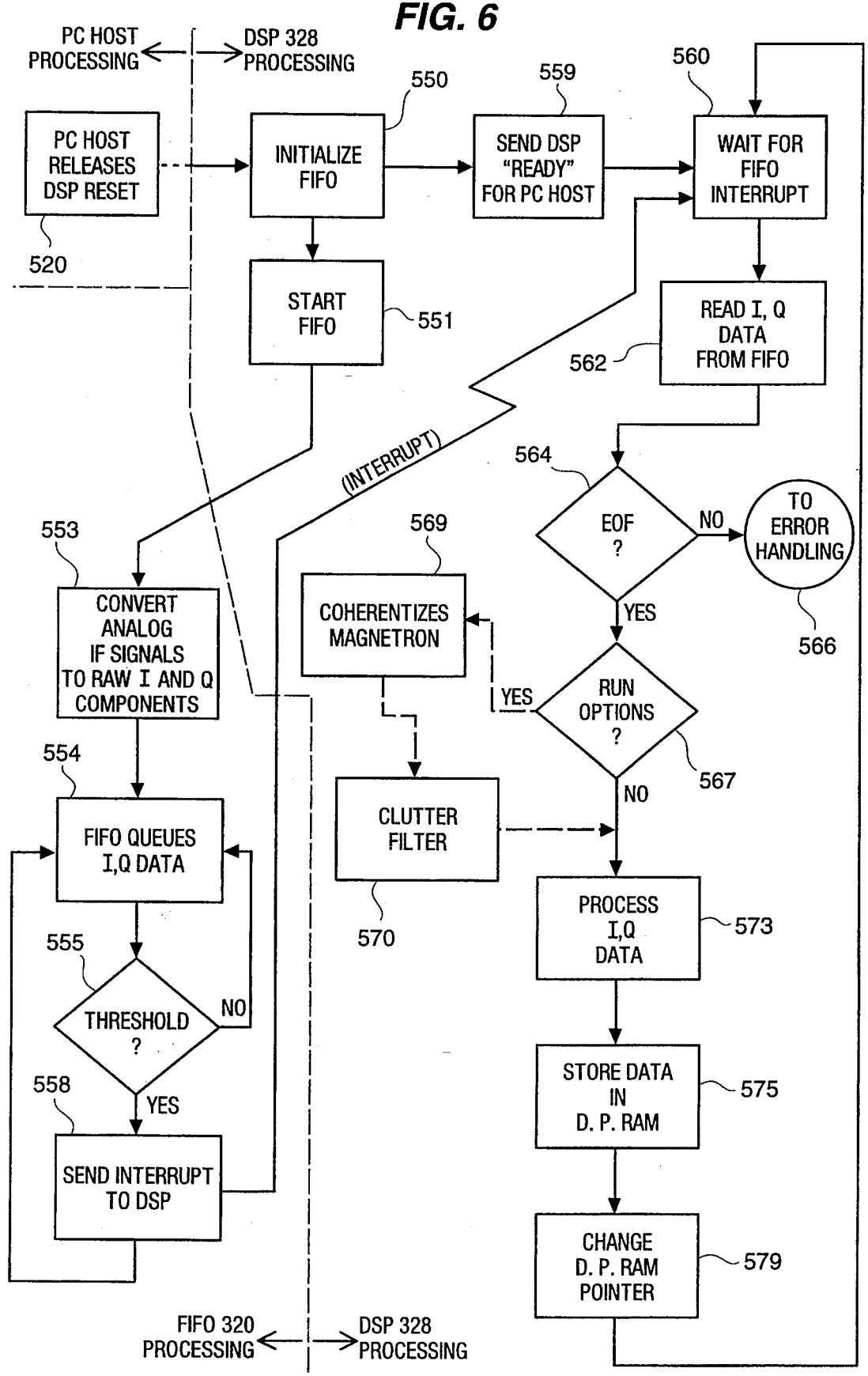

Operational System Description—FIGS. 5 and 6

FIGS. 5 and 6 illustrate the operational details of the PIRAQ system 200 in flow diagram form. The PC host processor 239 is powered up or otherwise reset at step 502. Processing steps from the PC host processor 239 perspective appear as follows. The DPRAM 325 and its accompanying pointers and registers on the electronic circuit module 245 are initialized at step 504. DSP 328 is held in reset by the PC host processor 239 at step 507 while a timing generator 308 is initialized and DSP 328 programming code is downloaded into the DPRAM 325 at steps 510 and 515 respectively. On reset, DSP 328 will look to the DPRAM 325 for executable instructions placed in the DPRAM 325 by way of the PC Bus interface 315. The PC host processor 239 releases DSP 328 from reset at step 520 so that PC host processor 239 and the electronic circuit module 245 function independently but in concert with each other. That is, DSP 328 begins processing at step 550 while PC host processor 239 waits to receive the processed radar data at step 525.

Specifically, PC host processor 239 waits for a DSPREADY interrupt at step 525 until such time as DSP 328 signals the PC host processor 239 that the DSP 328 is READY and processing. Subsequent processing steps by PC host processor 239 in FIG. 5 are discussed below in order to describe the intervening processing steps in FIG. 6 which are significant in setting the stage for interaction between the PC host processor 239 and the electronic circuit module 245.

FIG. 6 illustrates the radar acquisition system processing steps once DSP 328 is taken out of reset at step 520. FIFO 320 is cleared and initialized at step 550 and the FIFO is started at step 551. Incoming raw I and Q data is queued in FIFO 520 at step 554 so long as one of the predetermined data occupancy thresholds has not been reached. When FIFO 320 reaches one of the predetermined data occupancy thresholds at decision block 555, an interrupt is sent to DSP 328 at step 558 to notify the DSP 328 that I and Q data is available for processing. After sending the interrupt to DSP 328, FIFO 320 returns to queuing additional raw I and Q data at step 554.

In the mean time, DSP 328 sends a DSPREADY signal to the PC host processor 239 at step 559 and the DSP 328 waits for the FIFO interrupt at step 560 as previously discussed. Once the FIFO 320 interrupt is received by DSP 328, the DSP begins reading from FIFO 320 at step 562. The timing of the FIFO 320 interrupt to the DSP 328 is tuneable according to the particular radar installation demands, so that the FIFO 320 can continue queuing incoming radar data at step 554 without reaching full capacity prior DSP 328 reading from the FIFO 320 queue.

DSP 328 reads data from FIFO 320 until an End Of Frame (EOF) indicator is reached at decision block 564. If no EOF is encountered, an error condition exists that is handled by an error handling routine at step 566. The type error handling desired for a given installation is a matter of design choice subject to the radar installation requirements, and may include lighting specific LED's in LED bank 335 as previously discussed for example. If an EOF is encountered at decision block 564, decision block 567 determines whether or not the data will be optionally run through a magnetron coherentizer at step 569 and/or clutter filter at step 570 as a matter of design choice. Coherentizing at step 569 is optional because it is not necessary for a radar installation having coherent transmitters. Clutter filtering at step 570 is optional where removing the clutter is desirable.

Whether or not the optional steps 569 and/or 570 are taken, the data is digitally processed by DSP 328 at step 573 and the results stored in DPRAM 325 at step 575. At step 579, the address pointer to DPRAM 325 is updated so which coordinates reading and writing to the DPRAM 325 as between DSP 328 and PC host processor 239. DSP 328 processing then continues at step 560 where the DSP 328 waits for a FIFO interrupt. Note that an interrupt from FIFO 320 to the DSP 328 may occur at any time during DSP 328 processing thereby making system tuning imperative to avoid overwritten data in FIFO 320.

At such time as PC host processor 239 receives the DSPREADY signal at step 525 in FIG. 5, the PC host processor 239 starts PIRAQ timing generator 308 at step 527 and waits for the DPRAM address pointer to change at step 528 as discussed previously. When the DPRAM pointer changes, the PC host processor 239 proceeds at step 535 to read processed data from DPRAM 325 and permanently record the data in recording device 250 for later reference as needed. The data is also displayed at step 538 in any manner defined by the implementation on a display device or devices 232. If no user input "quit" command has been received by the PC host processor 239, processing continues at step 528 where PC host processor 239 waits for the DPRAM address pointer to change at step 528. In the mean time, FIFO 320 and DSP 328 continue processing radar data in concert as previously described and illustrated.

If a user input "quit" command has been received at step 540, PC host processor 239 shuts down the PIRAQ system 200 at step 545. Other user input commands may be detected at decision block 540 and executed at step 545 as a matter of design choice.

Summary

The PIRAQ system provides a standard input standard output, digital, programmable, and integrated radar acquisition system implemented on a single standard personal computer "add-on" electronic circuit module for use in a personal computer. While specific embodiments of this invention are disclosed herein, it is expected that those skilled in the art can and will design alternate embodiments of this invention that fall within the scope of the following claims.

We claim:

1. A radar acquisition system comprising:

an electronic circuit module operatively connected to a host processor, wherein said electronic circuit module contains a plurality of signal processing components thereon;

means for receiving a radio wave;

means for converting said radio wave into an analog intermediate frequency signal; and means for producing in-phase and quadrature signal components from said analog intermediate frequency signal by way of at least one of said plurality of signal processing components independent of any radar signal processing component external to said electronic circuit module and said host processor.

2. A system according to claim 1 wherein said means for receiving said radio wave comprises:

a high frequency radar antenna.

3. A system according to claim 1 wherein said processor is a personal computer.

4. A system according to claim 1 wherein said means for converting comprises:

means for amplifying said radio wave;

means for converting said radio wave into an analog intermediate frequency signal; and means for filtering said analog intermediate frequency signal with a wideband anti-alias filter to remove unnecessary frequencies from said analog intermediate frequency signal.

5. A system according to claim 1 wherein said means for producing in-phase and quadrature signal components comprises:

means for mixing said analog intermediate frequency signal with an oscillator signal to produce a plurality of limited bandwidth center frequency signals; and means for filtering said plurality of limited bandwidth center frequency signals to reject low frequency noise, frequency harmonics, and low frequency side-bands prior to digitizing said plurality of limited bandwidth center frequency signals.

6. A system according to claim 5 further comprising:

means for converting said plurality of limited bandwidth center frequency signals to a digital intermediate frequency signal;

means for mixing said digital intermediate frequency signal with a sine oscillator input to reduce said digital intermediate frequency signal into a series of sums and differences therebetween in a first output signal;

means for mixing said digital intermediate frequency signal with a cosine oscillator input to reduce said digital intermediate frequency signal into a series of sums and differences therebetween in a second output signal in parallel with said first output signal; and means for filtering said first output signal and said second output signal to reject low frequency signal interference produced by said converting means thereby producing high-frequency baseband in-phase and quadrature signal components.

7. A system according to claim 6 further comprising:

means for accumulating said series of sums and differences for a plurality of range gates within a signal pulse width for said first output signal and said second output signal wherein said accumulating means is programmable with respect to said plurality of range gates, said signal pulse width, and a control frequency; and means for digitally filtering out sums from said first output signal and said second output signal to produce raw in-phase and quadrature signal components.

8. A system according to claim 1 further comprising:

means for generating a plurality of timing signals from a single timing generator for use by said plurality of signal processing components.

9. A system according to claim 1 further comprising:

means for networking a plurality of said electronic circuit modules wherein said input frequency for each of said electronic circuit modules is user programmable and of a mode type selected from the group consisting of: synchronous, and asynchronous;

means for interfacing with each of said plurality of said electronic circuit modules for debugging purposes; and means for reporting electronic circuit module status to a user by way of predefined and user programmable visual indicators.

10. A system according to claim 1 further comprising:

means for interconnecting said plurality of signal processing components on said electronic circuit module in at least one manner selected from the group consisting of: surface mounted, printed circuit, and integrated circuit, wherein said plurality of signal processing components are interconnected therebetween absent any board external cabling.

11. A system according to claim 1 further comprising:

means for digitally discriminating frequency drift resulting from an incoherent transmission received by way of said receiving means; and means for compensating for said frequency drift by altering said transmission frequency toward a predetermined ideal frequency.

12. A radar acquisition system comprising: an electronic circuit module having a plurality of radar signal processing components thereon;

a host processor operatively connected to said electronic circuit module;

means for inputting an analog intermediate frequency radar signal to said electronic circuit module; and means for generating in-phase and quadrature signal components from said analog intermediate frequency radar signal by way of at least one of said plurality of radar signal processing components on said electronic circuit module independent of any radar signal processing component external to said electronic circuit module and said host processor.

13. A method for processing a radio wave in a radar acquisition system, said method comprising the steps of:

operatively connecting an electronic circuit module to a processor, wherein said electronic circuit module contains a plurality of signal processing components thereon;

converting said radio wave into an analog intermediate frequency signal; and producing in-phase and quadrature signal components from said analog intermediate frequency signal by way of at least one of said plurality of signal processing components independent of any radar signal processing component external to said electronic circuit module and said host processor.

14. A method according to claim 13 wherein said step of converting comprises:

amplifying said radio wave;

converting said radio wave into an analog intermediate frequency signal; and filtering said analog intermediate frequency signal with a wideband anti-alias filter to remove unnecessary frequencies from said analog intermediate frequency signal.

15. A method according to claim 13 wherein said step of producing in-phase and quadrature signal components comprises:

mixing said analog intermediate frequency signal with an oscillator signal to produce a plurality of limited bandwidth center frequency signals; and filtering said plurality of limited bandwidth center frequency signals to reject low frequency noise, frequency harmonics, and low frequency side-bands prior to digitizing said plurality of limited bandwidth center frequency signals.

16. A method according to claim 15 further comprising:

converting said plurality of limited bandwidth center frequency signals to a digital intermediate frequency signal;

mixing said digital intermediate frequency signal with a sine oscillator input to reduce said digital intermediate frequency signal into a series of sums and differences therebetween in a first output signal;

mixing said digital intermediate frequency signal with a cosine oscillator input to reduce said digital intermediate frequency signal into a series of sums and differences therebetween in a second output signal in parallel with said first output signal; and filtering said first output signal and said second output signal to reject low frequency signal interference produced by said step of converting thereby producing high-frequency baseband in-phase and quadrature signal components.

17. A method according to claim 16 further comprising:

accumulating said series of sums and differences for a plurality of range gates within a signal pulse width for said first output signal and said second output signal wherein said accumulating means is programmable with respect to said plurality of range gates, said signal pulse width, and a control frequency; and digitally filtering out sums from said first output signal and said second output signal to produce raw in-phase and quadrature signal components.

18. A method according to claim 13 further comprising:

generating a plurality of timing signals from a single timing generator for use by said plurality of signal processing components.

19. A method according to claim 13 further comprising:

networking a plurality of said electronic circuit modules wherein said input frequency for each of said electronic circuit modules is user programmable and of a mode type selected from the group consisting of: synchronous, and asynchronous;

interfacing with each of said plurality of said electronic circuit modules for debugging purposes; and reporting electronic circuit module status to a user by way of predefined and user programmable visual indicators.

20. A method according to claim 13 further comprising:

interconnecting said plurality of signal processing components on said electronic circuit module in at least one manner selected from the group consisting of: surface mounted, printed circuit, and integrated circuit, wherein said plurality of signal processing components are interconnected therebetween absent any board external cabling.

21. A method according to claim 13 further comprising:

digitally discriminating frequency drift resulting from an incoherent transmission received by way of said receiving means; and compensating for said frequency drift by altering said transmission frequency toward a predetermined ideal frequency.

22. A method for processing radar data in a radar acquisition system, said method comprising:

operatively connecting an electronic circuit module to a host processor, wherein said electronic circuit module contains a plurality of radar signal processing components thereon;

inputting an analog intermediate frequency signal to said electronic circuit module; and generating in-phase and quadrature signal components from said analog intermediate frequency signal by way of at least one of said plurality of radar signal processing components on said electronic circuit module independent of any radar signal processing component external to said electronic circuit module and said host processor.

\* \* \* \* \*